UNITED STATES PATENT OFFICE.

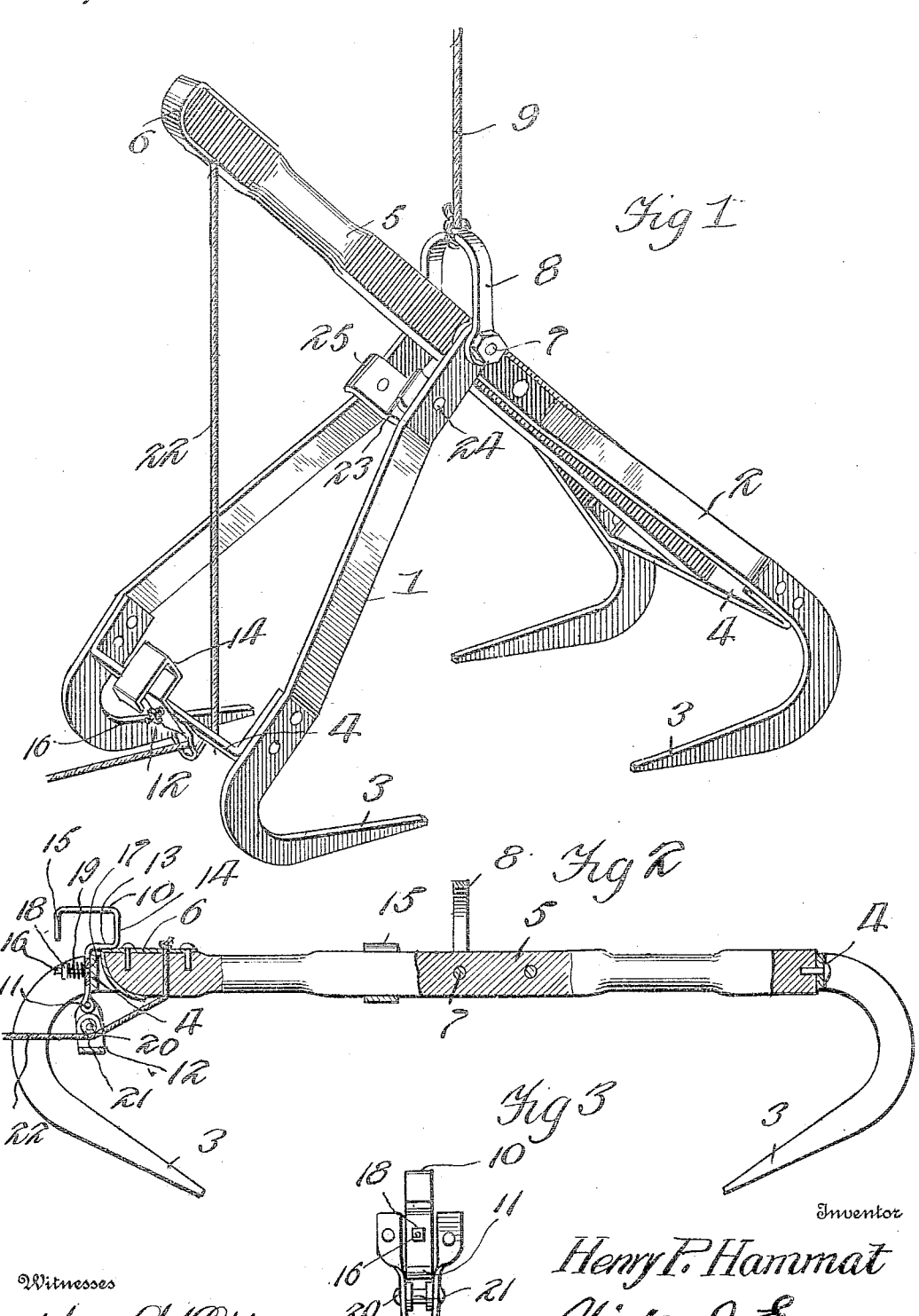

HENRY PIERRE HAMMAT, OF KAHOKA, MISSOURI.

HAY-GRAPPLE.

953,613.  Specification of Letters Patent.  Patented Mar. 29, 1910.

Application filed February 19, 1909. Serial No. 478,899.

*To all whom it may concern:*

Be it known that I, HENRY PIERRE HAMMAT, a citizen of the United States, residing at Kahoka, in the county of Clark and State of Missouri, have invented new and useful Improvements in Hay-Grapples, of which the following is a specification.

This invention relates to hay grapples or forks adapted to be employed in connection with hay elevating and stacking devices, and the object of the invention is to provide a grapple comprising a pair of forked members hingedly connected together, one of said forked members being provided with an extending bead or tongue which is adapted to be engaged by a spring catch carried by the opposite fork member when the forks are in their opened position.

Another object of the invention is to provide a device of this character with means whereby the hay secured between the coacting pair of hinged forks may be deposited at any desired location. The said forks being spread or brought to their open position and secured therein so that the device may be conveyed by the hoisting and elevating apparatus to a locality at which the hay to be stacked is positioned, the device being provided with a suitable spring catch or hook having means whereby the tension thereon may be readily regulated and which is adapted to be operated by the finger of an attendant, so that the forks will swing downwardly or to their closed or grappling position to engage the hay.

With the above, and other objects in view, which will appear as the description progresses, the invention resides in the novel construction and arrangement of elements, hereinafter fully described and claimed.

In the accompanying drawings there has been illustrated a simple and preferred form of the device, in which, Figure 1 is a perspective view of the improved grapple showing the fork members closed. Fig. 2 is a central longitudinal sectional view showing the forks in their open position. Fig. 3 is a rear elevation of a spring catch and a pulley carried thereby.

In the drawing the numerals 1 and 2 designate the fork members of the improved grapple. These members 1 and 2 each comprise a pair of spaced members having their body portions diverging outwardly from each other and their extremities formed with the teeth or hooks 3. The hooks 3 are retained in spaced relation with each other through the medium of transverse spacing elements 4. The arms of the member 2 are provided with a longitudinal extending beam 5 which has one of its ends connected with the transverse spacing element 4 and its opposite end rounded and provided with a bearing plate as designated by the numeral 6. This rounded portion of the beam 5 is adapted, when the fork members are sustained in their open position to lie in close proximity to the transverse connecting bar 4 of the fork member 1.

The spaced arms of the member 1 opposite the teeth 3 are adapted to engage the sides of arms of the member 2 connected with the beam 5, and to be secured thereto through the medium of a suitable pintle 7. This pintle 7 also connects a bail 8 with the device, and this bail is adapted for the reception of an operating cable 9 connected with the hoisting and traveling mechanism of the conveyer, which is well known in the art and is not illustrated in the drawing. The spacing bar 4 of the element 1 is provided with a suitable spring catch 10 which is pivotally connected at its lower extremity through the medium of a suitable pintle 11 mounted in suitable openings in the sides of a yoke 12. The catch 10 is constructed of a single piece of suitable material, and is bent forwardly as at 13 to provide a lip which is adapted to engage the upper face of the rounded extension 6 of the arm 5. The member 10 is also provided with a substantially vertical extension 14 having its end bent rearwardly to provide a finger hold or member 15. By this arrangement it will be noted that the catch 10 may be readily swung upon its pivot 11 so as to become readily disengaged from the arm 5 when the members 1 and 2 are to be swung closed upon their pivot 7.

The numeral 16 designates an outwardly extending threaded bolt member secured upon the connecting bar 4 and projecting through a suitable opening 17 provided upon the catch 10. The bolt 16 is adapted for the reception of a suitable nut or other threaded element, and interposed between this element 18 and the face of the catch 10 is a helical spring 19 which is adapted to exert pressure upon the said catch 10 and to force the same normally in contact with the outer face of the connecting bar 4. By this arrangement it will be noted that the tension may be readily regulated in regard to the catch 10 so that its engaging lip 13 may be forcibly brought into engagement with the bar 5 and effectively sustained in its engaged position without danger of becoming displaced.

The yoke 12 is adapted to extend downwardly a suitable distance beyond the connecting bar 4 and has its side arms provided with alining openings adapted for the reception of a suitable shaft 20 upon which is rotatably mounted a pulley 21. This pulley 21 is preferably grooved and is adapted for the reception of a suitable cable 22 which has one of its ends connected with the lower face of the beam 5 adjacent its rounded end.

When the members 1 and 2 are swung upon their pivot 7 to the position illustrated in Fig. 2 of the drawings it is desirable and necessary that the said members should be retained in perfect alinement with each other, and in order to provide for this I have provided the spaced members comprising the fork 1 with a suitable U-shaped stop 23. This stop 23 has its side arms connected with the arms of the member 1 as indicated by the numeral 24 and the said side arms are also projected slightly above and curved outwardly from the arms of the member 1 as indicated by the numeral 25. By this arrangement it will be noted that when the cable 22 is pulled so as to rotate the beam 5 upon its pivot 7 the said beam will be guided between the arms and into engagement with the lower face of the stop 23 and when the end 6 is engaged by the catch 10 it will be noted that the beam has both its upper and lower faces engaged to prevent movement in either an upward or downward direction and that the arms of the U-shaped stop 23 effectively prevent lateral movement of the member 2 in relation to the member 1.

From the above description, taken in connection with the accompanying drawing it will be noted that I have provided an extremely simple and effective device for the purpose set forth, one wherein the fork or grapple members may be readily swung so as to deposit the hay gathered by the said members at any desired position in relation to the hoisting apparatus, one wherein the fork members may be readily swung to a gathering position, one wherein the hook member 10 is provided with a tension device so as to regulate its inward pressure and to sustain the same in locked position upon the beam of the opposite fork member.

While I have illustrated and described the catch 10 as being operated through the medium of a person's finger grasping the offset or handle 15 when moving the said catch out of engagement with the beam 5, it will be understood that other means may be effectively employed for operating the said catch, as for instance a rope or other flexible element may be secured to the portion 15 of the latch and the latch thus operated by a person positioned a distance away from the grapple.

Having thus fully described the invention what is claimed as new is:

1. The combination with a pair of hinged forked members, a beam carried by one of the members and extending longitudinally toward the other member, a stop for the beam, each of the said forked members being arranged in pairs, spacing bars for the ends of the spaced forks, a downwardly extending U-shaped member upon one of the forks, a roller for the said member, a catch pivotally connected to the arms of the said member, a rearwardly projecting handle upon the catch, the catch being provided with an opening, a threaded element secured to the connecting bar and projecting through said opening, a threaded member for the threaded projection, a spring upon the threaded projection positioned between the catch and the threaded member upon the projection, and a flexible element connected with the projecting beam and engaging the roller and adapted to swing the beam into contact with the catch.

2. The combination with a pair of hinged forked members, spacing elements for each of the forked members, an extension upon one of the forked members, an offset catch upon the spacing element of the adjacent forked member adapted to contact and engage the extension of the first forked member to sustain the forked members in parallel relation with each other, and a spring tension device for the catch.

In testimony whereof I affix my signature in presence of two witnesses.

HENRY PIERRE HAMMAT.

Witnesses:
CHARLES HILLER,
SAM. S. HILLER.